US012269152B2

(12) United States Patent
Moore

(10) Patent No.: US 12,269,152 B2
(45) Date of Patent: Apr. 8, 2025

(54) HAMMER TOOL

(71) Applicant: Caterpillar Inc., Peoria, IL (US)

(72) Inventor: Cody Moore, Robinson, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/948,909

(22) Filed: Sep. 20, 2022

(65) Prior Publication Data

US 2024/0091922 A1 Mar. 21, 2024

(51) Int. Cl.
*B25D 17/02* (2006.01)
*E02F 3/96* (2006.01)

(52) U.S. Cl.
CPC .............. *B25D 17/02* (2013.01); *E02F 3/966* (2013.01); *B25D 2250/111* (2013.01); *B25D 2250/125* (2013.01)

(58) Field of Classification Search
CPC .............. B25D 17/02; B25D 2250/111; B25D 2250/125; E02F 3/966
See application file for complete search history.

(56) References Cited

U.S. PATENT DOCUMENTS

| | | | | | |
|---|---|---|---|---|---|
| 1,524,301 | A * | 1/1925 | Harry | B25D 17/084 | 279/19.3 |
| 1,726,295 | A * | 8/1929 | Gustafson | B25D 17/084 | 173/136 |
| 3,003,773 | A * | 10/1961 | Fuehrer | B25D 17/08 | 267/164 |
| 3,322,216 | A * | 5/1967 | Kurt | E21B 4/06 | 173/132 |
| 3,543,613 | A * | 12/1970 | Obloy | B23D 77/006 | 407/11 |
| 3,797,584 | A * | 3/1974 | Bailey | E21B 17/00 | 173/DIG. 3 |
| 4,106,573 | A * | 8/1978 | Bailey | B25D 17/084 | 279/19.3 |
| 4,107,949 | A * | 8/1978 | Wanner | B25D 17/088 | 464/167 |
| 4,131,165 | A * | 12/1978 | Wanner | B23Q 3/12 | 173/133 |

(Continued)

FOREIGN PATENT DOCUMENTS

| | | | |
|---|---|---|---|
| CN | 110714502 | A | 1/2020 |
| KR | 20100012748 | U | 12/2010 |
| WO | 2006061459 | A1 | 6/2006 |

OTHER PUBLICATIONS

Harvey Performance Company, "How to Avoid 4 Major Types of Tool Wear", Jul. 11, 2017; website: https://www.harveyperformance.com/in-the-loupe/avoiding-tool-wear/ (Year: 2017).*

(Continued)

*Primary Examiner* — Veronica Martin
*Assistant Examiner* — David G Shutty

(57) ABSTRACT

A tool for a hydraulic hammer of a work machine is disclosed herein. The tool comprises a spline section and a tool section. The spline section includes a first spline sector including at least six spline grooves and a second spline sector including at least six spline grooves. The first spline sector and second spline sector are separated by a spacer. The tool section diameter is 3.2-4.8 times larger than the spline groove diameter and the tool section diameter is smaller than a spline section diameter.

16 Claims, 4 Drawing Sheets

(56) References Cited

U.S. PATENT DOCUMENTS

| | | | | | |
|---|---|---|---|---|---|
| 4,858,701 | A * | 8/1989 | Weyer | E21C 27/28 | 279/19.5 |
| 5,065,827 | A * | 11/1991 | Meyers | E21B 17/076 | 175/414 |
| 5,704,744 | A * | 1/1998 | Kleine | B25B 23/0042 | 408/239 R |
| 5,984,596 | A * | 11/1999 | Fehrle | B25D 17/088 | 175/395 |
| 6,073,705 | A | 6/2000 | Shibata et al. | | |
| 6,938,710 | B2 * | 9/2005 | Simmons | E21B 4/14 | 175/57 |
| 7,309,195 | B2 * | 12/2007 | Kleine | B25D 17/088 | 175/395 |
| 7,438,138 | B2 * | 10/2008 | Andersson | B25D 16/00 | 173/132 |
| 8,985,245 | B2 * | 3/2015 | Purcell | E21B 17/076 | 175/417 |
| 9,719,306 | B2 * | 8/2017 | Seppala | E21B 17/076 | |
| 10,239,195 | B2 * | 3/2019 | Moore | B25D 17/02 | |
| 2004/0188146 | A1 * | 9/2004 | Egerstrom | E21B 4/14 | 175/296 |
| 2007/0089908 | A1 * | 4/2007 | Underwood | E21B 10/36 | 175/57 |
| 2007/0137895 | A1 * | 6/2007 | Marshall | E21B 17/076 | 175/57 |
| 2008/0206006 | A1 * | 8/2008 | Bohne | B23B 31/005 | 76/115 |
| 2010/0175928 | A1 * | 7/2010 | Lee | E21B 10/36 | 175/414 |
| 2010/0252330 | A1 * | 10/2010 | Gilbert | E21B 4/06 | 175/293 |
| 2017/0136611 | A1 | 5/2017 | Moore | | |

OTHER PUBLICATIONS

Pederson, N. L.; "Aspects of Stress in Optimal Shaft Shoulder Fillets", Journal of Strain Analysis for Engineering Design; 53(5), 285-294; 2018 (Year: 2018).*

Written Opinion and International Search Report for Int'l. Patent Appln. No. PCT/US2023/072544, mailed Dec. 7, 2023 (15 pgs).

* cited by examiner

HAMMER TOOL

TECHNICAL FIELD

The present disclosure generally relates to a hammer assembly for a work machine, and more particularly relates to a hammer tool of a hammer assembly.

BACKGROUND

Work machines such as excavators, backhoes, skid steers, wheel loaders, tractors, etc., are provided with a hammer assembly tool to demolish rock, concrete, earth material, or the like. Such hammer tools may be hydraulically powered utilizing a hydraulic circuit supplied with fluid to operate the hammer assembly. Generally, hydraulic hammers include a piston that provides reciprocating motion to a tool that demolishes rock, earth, concreate, or other material. The reciprocating piston may be driven by high pressure fluid from the hydraulic system. The force of the reciprocating piston may be transferred to the material to be demolished via the work tool.

Current hammer assemblies generally use cylindrical bushings into which the work tool is inserted when received in the hammer housing of the hammer assemblies. However, cylindrical bushings have certain disadvantages due to the fact they are often machined from solid stock, causing wasted material. Accordingly, when the work tool contacts the bushings, this often results in high contact pressure and accelerated wear. Moreover, bushings are often very large and heavy which makes replacement and maintenance more difficult. Since the tool is the part of the hydraulic hammer assembly through which the impact forces of the hydraulic hammer are passed to the material, the tool and bushings may experience significant wear. Accordingly, it may be necessary for the tool to be replaced at the worksite. It is also necessary for the tool to perform efficiently by reducing the stress exerted on the work tool while reducing the frequency of replacing component parts.

Others have disclosed tools for hydraulic hammer assemblies, but fail to provide a tool that is easily replaceable and handles the stress from the piston more uniformly to achieve longer use life. For example, US Publication No. 2017136611 discloses a tool configured to couple with a hydraulic hammer. The tool includes an upper portion comprising a shaft having a plurality of upper grooves, a plurality of lower grooves, a circumferential indentation disposed between the plurality of upper grooves and the plurality of lower grooves, and a lower portion connected to the upper portion comprising a tool tip. The disclosure fails to disclose a tool that can handle more uniform stress levels and reduced asymmetrical bending from the operation of a work machine hammer assembly.

It can therefore be seen that a need exists for an improved work tool for a hydraulic hammer of a work machine in the field for improved efficiency, operability, and versatility during installation, operation, and maintenance of the work machine.

SUMMARY OF THE DISCLOSURE

In accordance with one aspect of the disclosure, a tool for a hydraulic hammer of a work machine is disclosed. The tool comprises a spline section and a tool section, the spline section includes a first spline sector including at least six spline grooves and a second spline sector including at least six spline grooves, the first spline sector and second spline sector being separated by a spacer; and the tool section diameter is smaller than a spline section diameter.

In accordance with another aspect of the disclosure, a hammer assembly is disclosed herein. The hammer assembly comprises a hammer housing and a hammer tool. The hammer housing includes a hammer and a work chamber having a plurality of splines, a locking mechanism, and a retainer ring. The hammer tool is inserted in an opening in the hammer housing. The hammer tool has a spline section and a tool section, the spline section includes a first spline sector including at least six spline grooves and a second spline sector including at least six spline grooves, the first spline sector and second spline sector being separated by a spacer; and the tool section diameter is smaller than a spline section diameter.

In accordance with another aspect of the disclosure, a method of securing a hammer tool to a hammer assembly of a work machine is disclosed. The method comprises: providing the hammer assembly including a hammer housing and the hammer tool, the hammer housing including a hammer and a work chamber for receiving the hammer tool through an opening of the hammer housing, the work chamber having a plurality of splines and a locking mechanism; providing the hammer tool having a spline section and a tool section, the spline section includes a first spline sector including at least six spline grooves and a second spline sector including at least six spline grooves, the first spline sector and second spline sector being separated by a spacer, the tool section having a smaller diameter than the spline section; and inserting the hammer tool into the work chamber through an opening in the hammer housing; and rotating the locking mechanism around the hammer tool until in a locked state.

These and other aspects and features of the present disclosure will be better understood upon reading the following detailed description when read in conjunction with the accompanying drawings.

Figure 1:
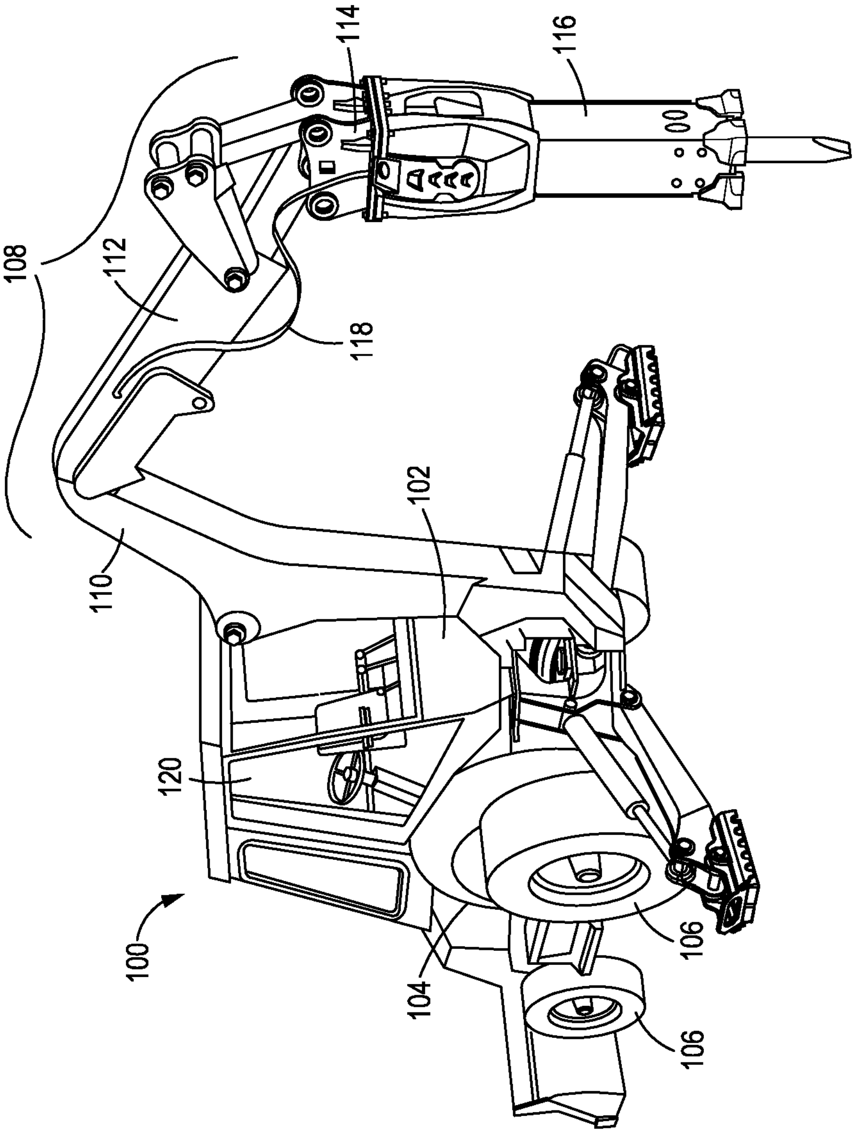
FIG. 1 is a perspective view of a work machine including a hammer assembly, according to an embodiment of the present disclosure.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to in the depicted example, an exemplary work machine 100 is shown, and illustrated as a backhoe loader. Backhoe loaders are heavy equipment designed to move earth material from the ground or landscape at a dig site in the construction and agricultural industries. While the following detailed description describes an exemplary aspect in connection with the backhoe loader, it should be appreciated that the description applies equally to the use of the present disclosure in other work machines including but not limited to excavators, front-end loaders, skid steers, wheel loaders, and tractors, as well.

Referring to FIG. 1, the work machine 100 includes a frame 102 supporting an engine 104. The frame 102 is supported on ground engaging elements 106, illustrated as wheels. It should be contemplated that the ground engaging elements 106 may be any other type of ground engaging elements 106 such as, for example, continuous tracks, etc. The work machine 100 further includes a working mechanism 108 extending from the frame for conducting work, such as, for example, demolishing landscapes, earth, concrete, rock, or other material at a dig site. The frame 102 may be an upper swiveling body common with excavators and work machines in the agricultural, construction, and mining industries. The working mechanism 108 includes a boom 110, an arm 112, a bracket 114, and a hammer assembly 116. The hammer assembly 116 may attach to the working mechanism 108 via the bracket 114. It may be recognized that the hammer assembly 116 may also attach to the working mechanism 108 via a coupler, quick coupler, or hydraulic quick coupler as generally known in the arts.

The hammer assembly 116 may be hydraulically actuated and connected to one or more hydraulic supply lines 118 via a hydraulic circuit (not shown) provided with the work machine 100. The hydraulic circuit may raise, lower, and/or swing the arm 112 and boom 110 to correspondingly raise, lower, and/or swing the hammer assembly 116. The work machine 100 may include a pump (not shown) connected to the hydraulic circuit and to the hammer assembly 116 through the one or more hydraulic supply lines 118. The hydraulic circuit may introduce pressurized fluid, for example oil, from the pump and into the one or more hydraulic supply lines 118 cylinders and to the hammer assembly 116. Operator controls for movement and actuating the hydraulic circuit and/or the hammer assembly 116 may be located within a cabin 120 of the work machine 100. A pressure control valve may be provided in the hammer assembly 116 to maintain maximum hydraulic pressure to ensure the hammer assembly 116 delivers all blows to demolish rock and the like at full power.

Figure 2:
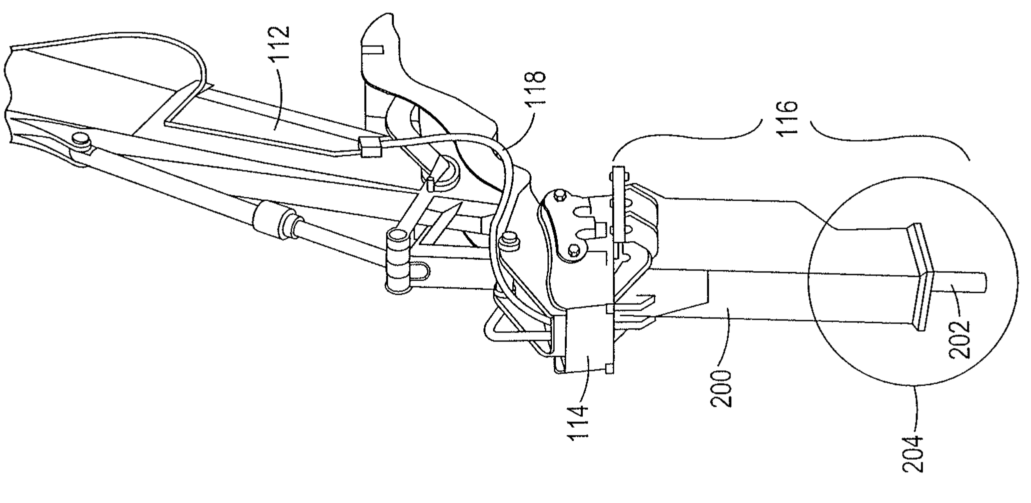
FIG. 2 is an enlarged perspective view of the hammer assembly of FIG. 1 connected to the boom of a work machine, according to an embodiment of the present disclosure.

Referring now to FIG. 2, a close-up of the hammer assembly 116 is illustrated connected to the arm 112 of the work machine 100. The hammer assembly 116 may include a hammer housing 200 and a hammer tool 202. The hammer tool 202 is connected to the hammer assembly 116 and located in a work chamber 204 inside the hammer housing 200. The hammer tool 202 extends outside the hammer housing 200, opposite the bracket 114, for contacting and/or demolishing rock, dirt, earth, ground, and the like. The hammer housing 200 may be a symmetrical, reversible housing that may rotate 180 degrees to compensate for wear and to extend the hammer assembly 116 life.

Figure 3:
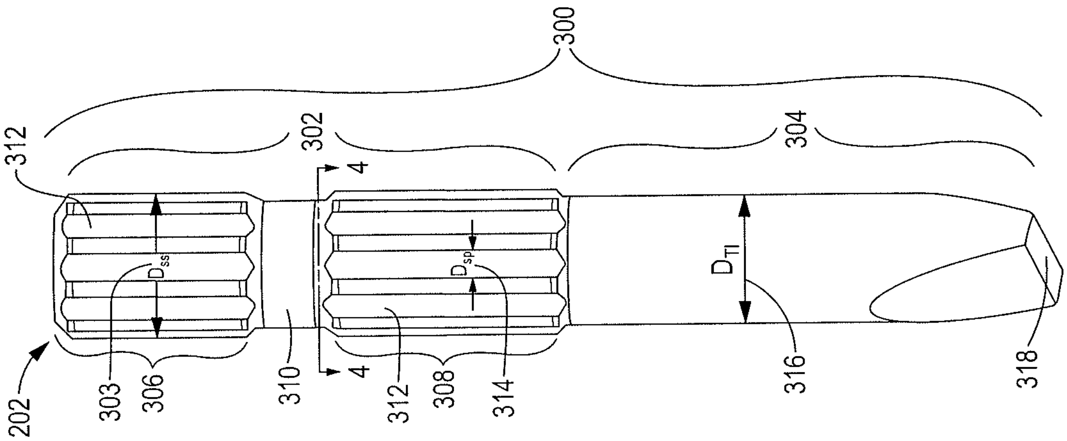
FIG. 3 is a perspective view of a hammer tool used with the hammer assembly of FIG. 2, according to an embodiment of the present disclosure.

FIG. 3 depicts a perspective view of a hammer tool 202 used with the hammer assembly 116. The hammer tool 202 may comprise a shaft 300 including a spline section 302 and a tool section 304. The spline section 302 is generally the portion of the shaft 300 of the hammer tool 202 that is received by the hammer housing 200 in the work chamber 204 of the hammer assembly 116. Conversely, the tool section 304 of the shaft 300 may generally include that portion of the hammer tool 202 that protrudes from the hammer assembly 116 and contacts the material being demolished. The spline section 302 has a larger diameter than the tool section 304.

The spline section 302 includes a first spline sector 306 and a second spline sector 308. The first spline sector 306 and the second spline sector 308 are separated by a spacer 310. The spacer 310 may be circular, square, octagonal, hexagonal, or polygonal shaped. The first spline sector 306 and the second spline sector 308 may each comprise a plurality of spline grooves 312 having a spline diameter 314. The spline grooves 312 in the first spline sector 306 may correspondingly align with the spline grooves 312 in the second spline sector 308.

Each of the spline grooves 312 in the first spline sector 306 may align with the spline grooves 312 in the second spline sector 308 and each may be hemispherical or curve shaped. As an alternative, each of the spline grooves 312 may be square, trapezoidal, or rectangularly shaped. The first spline sector 306 may include the spline grooves 312 and a corresponding number of spline grooves 312 in the second spline sector 308. In one embodiment, the first spline sector 306 and the second spline sector 308 may each include 6-12 spline grooves 312. For example, the first spline sector 306 may include between 6 and 12 spline grooves 312 and an equal number of spline grooves 312 in the second spline sector 308. Of course, other numbers of spline grooves 312 are possible. The spline grooves 312 may be equidistantly situated around the circumference of the spline section 302 in both the first spline sector 306 and the second spline sector 308.

The tool section includes a tool section diameter 316 and the tool section diameter 316 may be multiple times larger than the spline diameter 314. For example. The tool section diameter 316 may be 3.2 to 4.8 times larger than the spline diameter 314, but of course these are only exemplary ranges. The first spline sector 306 and the second spline sector 308, having a spline section diameter 303, may be larger in diameter than the tool section diameter 316. The larger diameter of the first spline sector 306 and the second spline sector 308 lower the stress in bending of the hammer tool 202 because the stresses are distributed over a larger contact area. Additionally, when the spacer 310 is configured as a rounded center geometry with no tool pin notches it provides for less stress to travel through the hammer tool 202. In one embodiment, the hammer tool 202 may include a tool tip 318. The tool tip 318 may be a chisel point, moil point, conical point, spade, compaction plate, wedge, or other tool shape generally known in the arts to demolish rock, earth, or other material.

Figure 4:
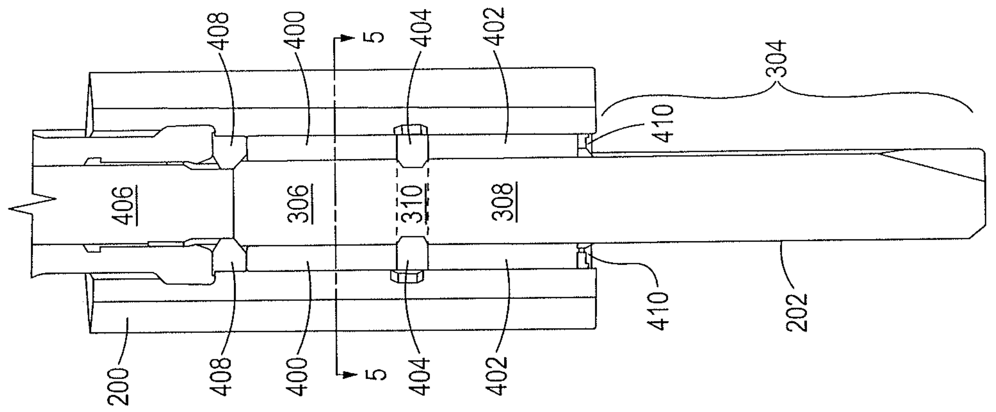
FIG. 4 is a cross-sectional view of the hammer tool of FIG. 3, taken along line 4-4 of FIG. 3, and illustrating the work chamber of the hammer assembly, according to an embodiment of the present disclosure.

FIG. 4 provides a cross-section of the hammer tool 202 of FIG. 3, in one embodiment of the disclosure, taken along line 4-4 of FIG. 3 and illustrating the work chamber 204 of the hammer assembly 116. The work chamber 204 includes a first set of splines 400 and a second set of splines 402 separated by a locking mechanism 404. The locking mechanism 404 may also be commonly referred to as a "tool stop" and configured as a ring to be situated around the spacer 310 of the hammer tool 202.

The first set of splines 400 corresponds to the spline grooves 312 in the first spline sector 306 and the second set of splines 402 corresponds to the spline grooves 312 in the second spline sector 308 on the hammer tool 202. The first set of splines 400 and the second set of splines 402 may be aligned, coaxially or otherwise. There may be 6-12 splines each in the first set of splines 400 and the second set of splines 402, but other numbers of splines are possible. The first set of splines 400 and the second set of splines 402 may be wear rods that are cylindrical rods, square rods, or polygonal rods.

FIG. 4 illustrates, in one embodiment, the hammer tool 202 operatively coupled to a hammer 406 inside the hammer housing 200 whereby the hammer 406 is positioned above the spline section 302 of the hammer tool 202. The hammer 406 may be a piston or other hammer type that provides a reciprocating impact motion to the hammer tool 202, as generally known in the arts.

The hydraulic circuit in the work machine 100 may be operatively connected to the hammer assembly 416 and may provide pressurized fluid to cause the hammer 406 to alternately reciprocate in a work stroke and return stroke pattern, as generally known in the arts. Operator controls for movement of the working mechanism 108 and/or the hammer assembly 116 may be located within a cabin 120 of the work machine 100. Driven by a hydraulic supply, the hammer inside the hammer housing 200 may provide a reciprocating impact motion to the hammer tool 202, which, in turn, may be applied to a material, such as rock or concrete, in contact with the hammer tool 202. It is contemplated that the hammer tool 202 may include any known tool capable of interacting with the hammer 406 and the ground, rock, or other material. The tool section 304, or a portion thereof, may enter and exit the hammer housing 200 during operation, such as when the hammer provides the reciprocating impact motion to the hammer tool 202.

There may be a thrust ring 408 around the connecting point where the hammer 406 contacts the hammer tool 202. There may also be a retaining ring 410 located at an end of the second set of splines 402 opposite the locking mechanism 404 for retaining the first set of splines 400 and the second set of splines 402 in the hammer assembly 116.

Figure 5:
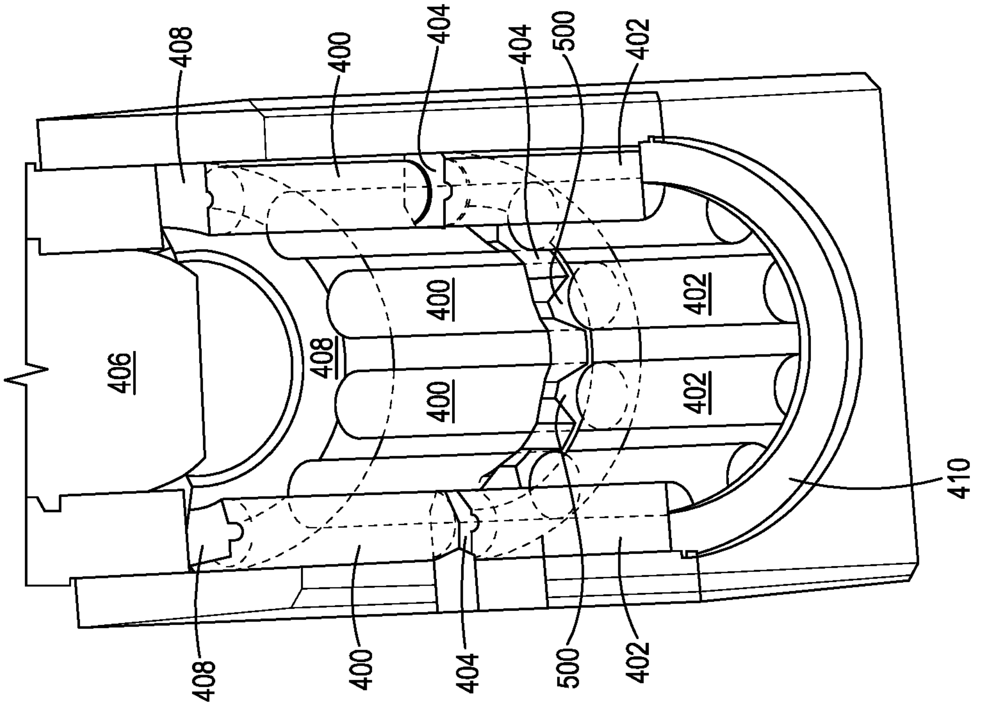
FIG. 5 is a cross-sectional view of the work chamber of FIG. 4, taken along line 5-5 of FIG. 4, according to an embodiment of the present disclosure.

Now referring to FIG. 5, a cross-sectional view of the work chamber 204 of taken along line 5-5 of FIG. 4 is illustrated in one embodiment. The locking mechanism 404 may configured to couple the hammer tool 202 within the hammer assembly 116. The locking mechanism 404 surrounds the spacer 310 of the hammer tool 202. The interior surface of the locking mechanism 404 that contacts the spacer 310 may include a plurality of locking indents 500 protruding out from the locking mechanism 404. The plurality of locking indents 500 may be shaped pyramidal, trapezoidal, square, or the like, with the spacer 310 configured to receive the plurality of locking indents 500. When the plurality of locking indents 500 are aligned with the first set of splines 400 and/or the second set of splines 402, then the hammer tool 202 is in an unlocked state with the hammer assembly 116. The hammer tool 202 may be easily removed from the hammer assembly 116 for repair when the locking mechanism 404 is in an unlocked state.

While the locking mechanism 404 is in an unlocked state, a replacement hammer tool 202 may be inserted into the work chamber 204 of the hammer assembly 116. When the locking mechanism 404 is rotated so that the plurality of locking indents 500 are misaligned with the first set of splines 400 and/or the second set of splines 402, then the hammer tool 202 is in a locked state with the hammer assembly 116.

Figure 6:
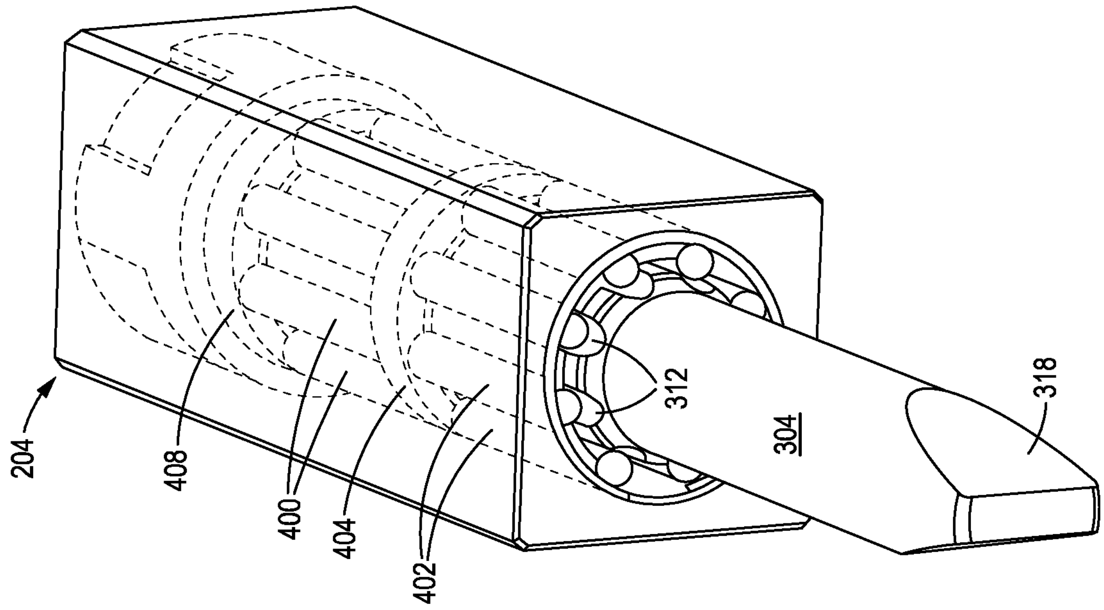
FIG. 6 is a perspective view of the hammer tool connected to a hammer assembly with the work chamber depicted in phantom lines, according to an embodiment of the present disclosure.

Now referring to FIG. 6, a perspective view of the work chamber 204 is illustrated in one embodiment. The first set of splines 400 and the second set of splines 402 are illustrated as a round shape, which is most efficient for machining processes. The first set of splines 400 and the second set of splines 402 may be small enough to handle by hand. The added surface area of the first set of splines 400 and the second set of splines 402 spreads the stress of contact with the hammer tool 202 by the hammer 406 among several splines. One or more of the splines may be easily replaced and/or re-used. The first set of splines 400 and the second set of splines 402 may be identical rods which reduces the part numbers required thereby providing simplified parts stocking and replacement.

The first set of splines 400 and the second set of splines 402 allow the hammer tool 202 to be rotated in the case of a chip damage, or wear and tear, of the tool tip 318 without requiring a unique part for a specified chisel angle direction required for demolishing rock, earth, or the like. For example, as illustrated in FIG. 6, the tool tip 318 may be shaped as wedged chisel tip that may be rotated so that the surface of the tool tip 318 may be at a preferred angle when contacting rock, earth, or other material during operation of the hammer assembly 116.

INDUSTRIAL APPLICABILITY

In operation, the present disclosure may find applicability in many industries including, but not limited to, the construction, earth-moving, mining, and agricultural industries. Specifically, the technology of the present disclosure may be used to demolish a variety of materials such as rock, concrete, asphalt, or other earth materials in a variety of work machines including, but not limited to, excavators, backhoes, skid steers, wheel loaders, tractors, and the like. While the foregoing detailed description is made with specific reference to backhoe loaders, it is to be understood that its teachings may also be applied onto the other work machines utilizing hammer assemblies such as excavators, skid steers, wheel loaders, tractors, mulchers, and the like.

Referring to FIGS. 1-6, the industrial applicability of the hammer tool 202 configured to couple to a hammer assembly 116 described herein will be readily appreciated from the foregoing discussion. According to some embodiments, the hammer assembly 116 and the hammer tool 202 may each be configured to facilitate a quick and low-effort coupling and/or decoupling of the hammer tool 202 from the hammer assembly 116. For example, since the hammer tool 202 is used to demolish hard material such as rock, the hammer tool 202 may experience significant wear and require quick replacement at the worksite with a new hammer tool 202 and easier maintenance.

In addition, the hammer tool 202 configured with one type of tool tip 318 (e.g., a chisel point) may be swapped for another hammer tool 202 with a different type of tool tip 318 (e.g., a compaction plate) according to the requirements of the work site and material required to be demolished.

While the locking mechanism 404 is in an unlocked state, the hammer tool 202 may be inserted into the work chamber 204 of the hammer assembly 116. When the operator has inserted the hammer tool 202 into the work chamber 204 of the hammer assembly 116, the locking mechanism 404 may be rotated to a locked state in which the hammer tool 202 is securely coupled with the hammer housing 200. An operator may rotate the locking mechanism 404 into the locked state. In the locked state, the spline grooves 312 in the first spline sector 306 are misaligned with the locking indents 500 and, thus, the locking indents 500 are also misaligned with the first set of splines 400 and the second set of splines 402. Due to the misalignment, the hammer tool 202 may be retained within the work chamber 204 of the hammer assembly 116 and, therefore, operatively coupled with the hammer housing 200.

Figure 7:
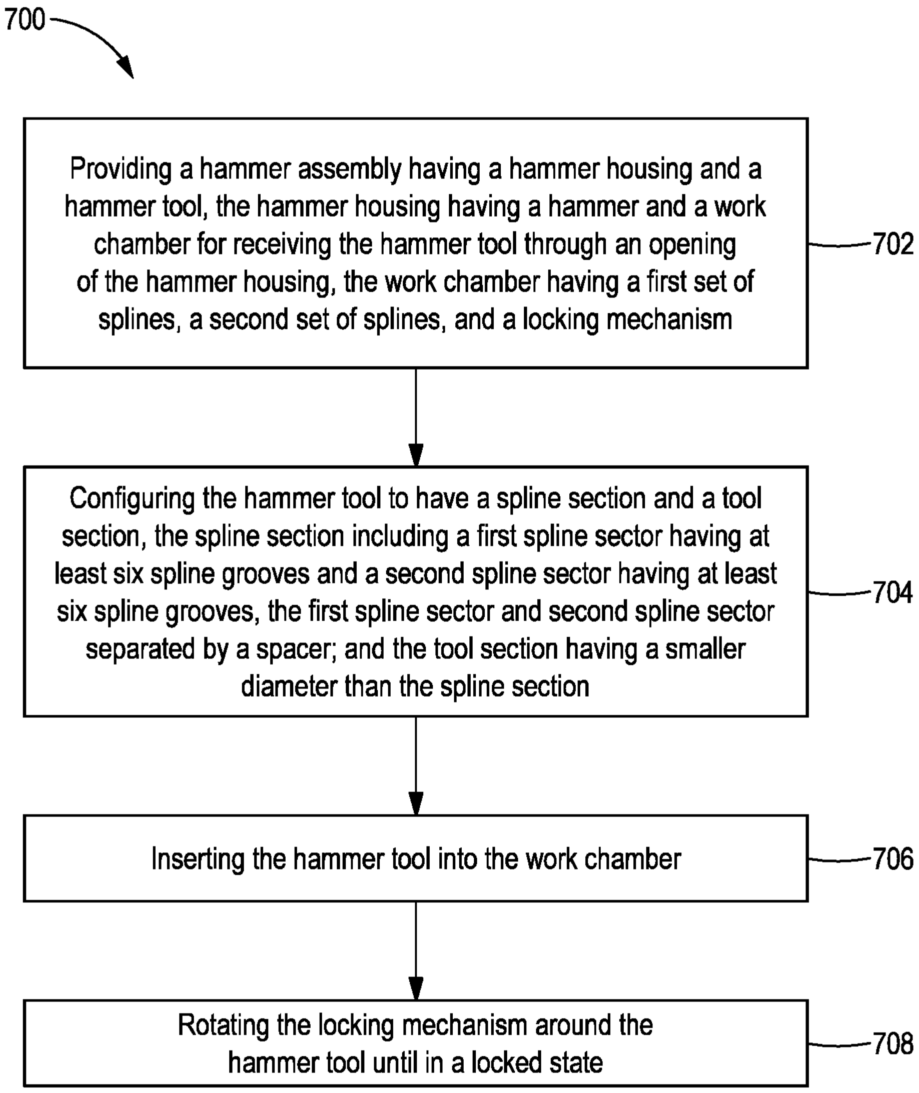
FIG. 7 is a flow-chart of a method for securing a hammer tool to a hammer assembly, according to an embodiment of the present disclosure.

Referring now to FIG. 7, a method 700 of securing the hammer tool 202 to the hammer assembly 116 of the work machine 100 is disclosed. In a first step 702, the hammer assembly 116 is provided having a hammer housing 200 and the hammer tool 202, the hammer housing 200 having the hammer 406 and the work chamber 204 for receiving the hammer tool 202 through an opening of the hammer housing 200, the work chamber 204 having the first set of splines 400, the second set of splines 402, and the locking mechanism 404. In a step 704, the hammer tool 202 is configured to have the spline section 302 and a tool section 304, the spline section 302 including a first spline sector 306 having at least six spline grooves 312 and a second spline sector 308 having at least six spline grooves 312, the first spline sector 306 and second spline sector 308 being separated by a spacer 310, and the tool section 304 having a smaller diameter than the spline section 302. In a step 706, the hammer tool 202 is inserted into the work chamber 204 through an opening in the hammer housing 200. In a last step 708, the locking mechanism is rotated around the hammer tool until in a locked state From the foregoing, it can be seen that the technology disclosed herein has industrial applicability in a variety of settings such as, but not limited to work machines in the construction, mining, and agricultural industries that utilize a hammer assembly using a work tool for demolishing rock, earth, or other material.

What is claimed is:

1. A hammer assembly comprising:

a hammer;

a hammer housing; and a work chamber in the hammer housing having a plurality of splines, a locking ring, a retainer ring, a hammer tool removably insertable in an opening in the hammer housing and into the work chamber, wherein the hammer tool includes:

a spline section, and a tool section, wherein the spline section of the hammer tool includes:

a first spline sector including at least six spline grooves, and a second spline sector including at least six splines, wherein the first spline sector and the second spline sector are separated by a spacer, wherein the tool section has a tool section diameter, wherein the first spline sector and the second spline sector are larger in diameter than the tool section diameter, wherein the tool section diameter is smaller than a spline section diameter, wherein each of the at least six splines of the second spline sector of the spline section transitions directly into the tool section, sloping from the spline section diameter to the tool section diameter, wherein the tool section diameter is 3.2-4.8 times larger than a spline groove diameter of each of the spline grooves, wherein the locking ring separates a first set of splines of the hammer housing from a second set of splines of the hammer housing, wherein the locking ring is a ring having locking indents disposed across an interior of the locking ring and is configured to rotate around the spacer between a locked state and an unlocked state, whereby the locked state couples the hammer tool to the hammer housing, wherein the locking indents are one chosen from the group consisting of pyramidal, squared, and trapezoidal, and wherein the plurality of splines are cylindrical wear rods each having a circular cross-section at least at ends thereof facing toward the locking ring.

2. The hammer assembly of claim 1, wherein the first spline set has 6-12 splines and the second spline set has 6-12 splines, and the first spline sector has 6-12 spline grooves configured to receive the first spline set and the second spline sector has 6-12 spline grooves configured to receive the second spline set.

3. The hammer assembly of claim 2, wherein the first spline sector and the second spline sector are each configured to receive the first set of splines and the second set of splines, respectively.

4. The hammer assembly of claim 3, wherein the first set of splines received by the first spline sector of the hammer tool are axially aligned with the second set of splines received by the second spline sector of the hammer tool.

5. The hammer assembly of claim 2, the hammer assembly is connected to a bracket of a work machine, the work machine including:

a frame;

a ground engaging element supporting the frame;

an engine in the frame and powers the work machine;

a working mechanism extending from the frame;

a hydraulic circuit; and the bracket being on an end of the working mechanism.

6. The hammer assembly of claim 1, the tool section includes a tool tip opposite the spline section, and the tool tip is chosen from the group consisting of a chisel point, a moil point, a conical point, a spade, a compaction plate, and a wedge.

7. The hammer assembly of claim 6, the plurality of splines of the work housing are configured to allow the hammer tool rotate about a central axis of the hammer tool.

8. The hammer assembly of claim 6, the hammer assembly is hydraulically powered.

9. A method of securing and maintaining a hammer tool to a hammer assembly of a work machine, the method comprising:

providing the hammer assembly including a hammer housing and the hammer tool, the hammer housing including a hammer and a work chamber for receiving the hammer tool through an opening of the hammer housing, the work chamber having a plurality of splines and a locking ring;

configuring the hammer tool to have a spline section and a tool section, the spline section including a first spline sector having at least six spline grooves and a second spline sector having at least six spline grooves, the first spline sector and the second spline sector being separated by a spacer, and the tool section having a smaller diameter than the spline section, the first spline sector, and the second spline sector, each of the at least six spline grooves of the second spline sector of the spline section transitioning directly into the tool section and sloping from the spline section diameter to the tool section diameter, and the tool section diameter is 3.2-4.8 times larger than a spline groove diameter of each of the spline grooves;

inserting the hammer tool into the work chamber through the opening in the hammer housing; and rotating the locking ring around the hammer tool until in a locked state, wherein the locking ring separates a first set of splines of the hammer housing from a second set of splines of the hammer housing, wherein the locking ring is a ring having locking indents disposed across an interior of the locking ring and is configured to rotate around the spacer between a locked state and an unlocked state, whereby the locked state couples the hammer tool to the hammer housing, wherein the locking indents are one chosen from the group consisting of pyramidal, squared, and trapezoidal, and wherein the plurality of splines are wear rods having a circular cross-section at least at ends thereof facing toward the locking ring.

10. The method of claim 9, the method further comprising:

operating the hammer assembly until the hammer tool is worn;

rotating the locking ring around the hammer tool until in an unlocked state;

removing the hammer tool from the work chamber through the opening and out of the hammer housing;

inserting a second hammer tool into the work chamber through the opening in the hammer housing; and rotating the locking ring around the replacement hammer tool until in a locked state.

11. The method of claim 9, the method further comprising:

operating the hammer assembly with a tool tip of the hammer tool until the tool tip is chipped; and rotating the hammer tool so the tool tip is in a new chisel angle direction during operation of the hammer assembly.

12. A hammer assembly comprising:

a hammer;

a hammer housing; and a work chamber in the hammer housing having a plurality of splines, a locking ring, a retainer ring, a hammer tool removably insertable in an opening in the hammer housing and into the work chamber, wherein the hammer tool includes:

a spline section, and a tool section, wherein the spline section of the hammer tool includes:

a first spline sector including at least six spline grooves, and a second spline sector including at least six splines, wherein the first spline sector and the second spline sector being are separated by a spacer, wherein the tool section has a tool section diameter, wherein the first spline sector and the second spline sector are larger in diameter than the tool section diameter, wherein the tool section diameter is smaller than a spline section diameter, wherein the spline section transitions directly into the tool section, sloping from the spline section diameter to the tool section diameter, wherein the tool section diameter is 3.2-4.8 times larger than a spline groove diameter of each of the spline grooves, wherein the locking ring is a ring having locking indents disposed across an interior of the locking ring and is configured to rotate around the spacer between a locked state and an unlocked state, whereby the locked state couples the hammer tool to the hammer housing, wherein the locking indents are one chosen from the group consisting of pyramidal, squared, and trapezoidal, and wherein the plurality of splines each have a circular cross-section at least at ends thereof facing toward the locking ring.

13. The hammer assembly of claim 12, wherein the first spline set has 6-12 splines and the second spline set has 6-12 splines, and the first spline sector has 6-12 spline grooves configured to receive the first spline set and the second spline sector has 6-12 spline grooves configured to receive the second spline set.

14. The hammer assembly of claim 12, wherein the tool section includes a tool tip opposite the spline section, and the tool tip is chosen from the group consisting of a chisel point, a moil point, a conical point, a spade, a compaction plate, and a wedge.

15. The hammer assembly of claim 12, wherein the plurality of splines of the work housing are configured to allow the hammer tool rotate about a central axis of the hammer tool.

16. The hammer assembly of claim 12, wherein the first spline sector and the second spline sector are each configured to receive the first set of splines and the second set of splines, respectively.

* * * * *